United States Patent [19]

McIlrath

[11] 4,156,991

[45] Jun. 5, 1979

[54] RAIL CUTTING APPARATUS

[75] Inventor: William P. McIlrath, Racine, Wis.

[73] Assignee: Racine Railroad Products, Inc., Racine, Wis.

[21] Appl. No.: 867,832

[22] Filed: Jan. 9, 1978

[51] Int. Cl.² .............................................. B23B 23/02
[52] U.S. Cl. ................................ 51/178; 51/241 LG
[58] Field of Search ................... 51/241 LG, 178, 99, 51/241 S; 30/372, 388; 83/490, 698

[56] References Cited

U.S. PATENT DOCUMENTS

| 3,974,596 | 8/1976 | Huboud-Peron | 51/178 |
| 4,033,074 | 7/1977 | Lutts | 51/178 |

Primary Examiner—Harold D. Whitehead
Assistant Examiner—Roscoe V. Parker
Attorney, Agent, or Firm—Wegner, Stellman, McCord, Wiles & Wood

[57] ABSTRACT

A rail cutting apparatus mountable on a rail and having a linkage structure with an offset arm connected to one end of the linkage, a cutting device having a mounting bar with a mounting element lying in a plane containing the cutting element of the cutting device, said mounting element being connected to the offset arm for rotation about an axis lying in said plane, and coacting means on the offset arm and mounting bar to positively limit the rotative positions of the cutting device and accurately position the cutting device for cutting of the rail.

2 Claims, 5 Drawing Figures

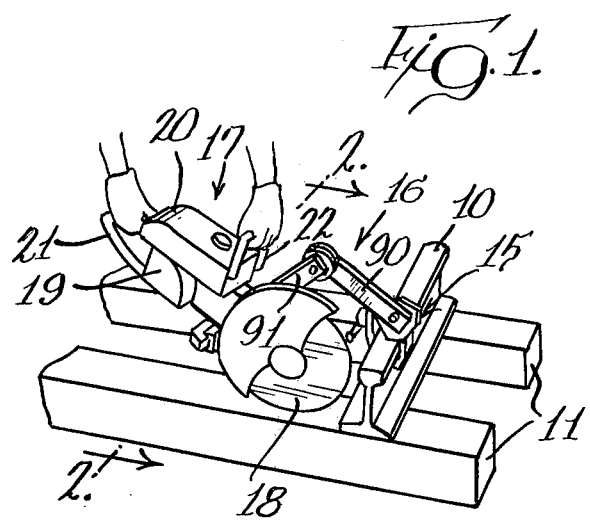
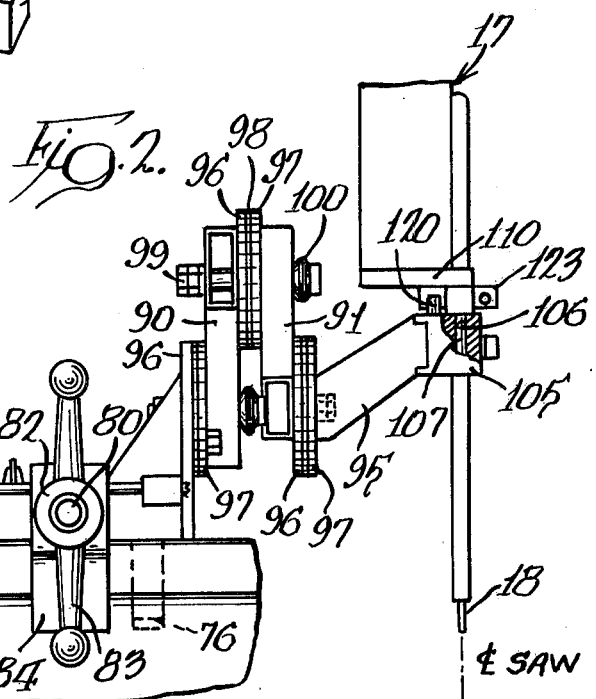
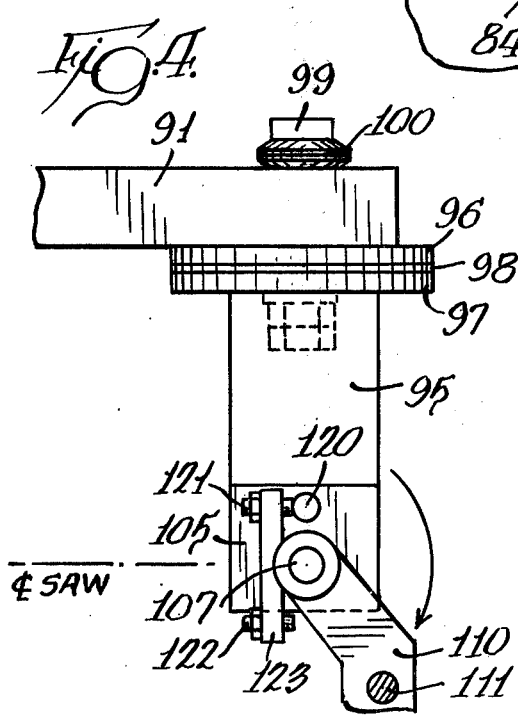
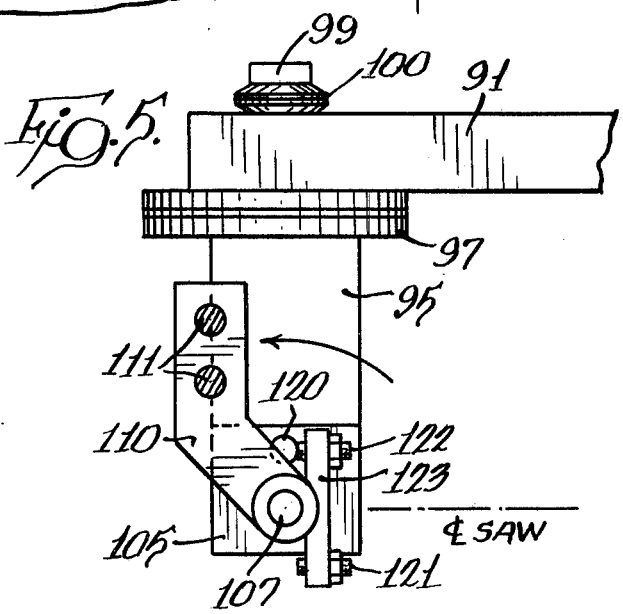

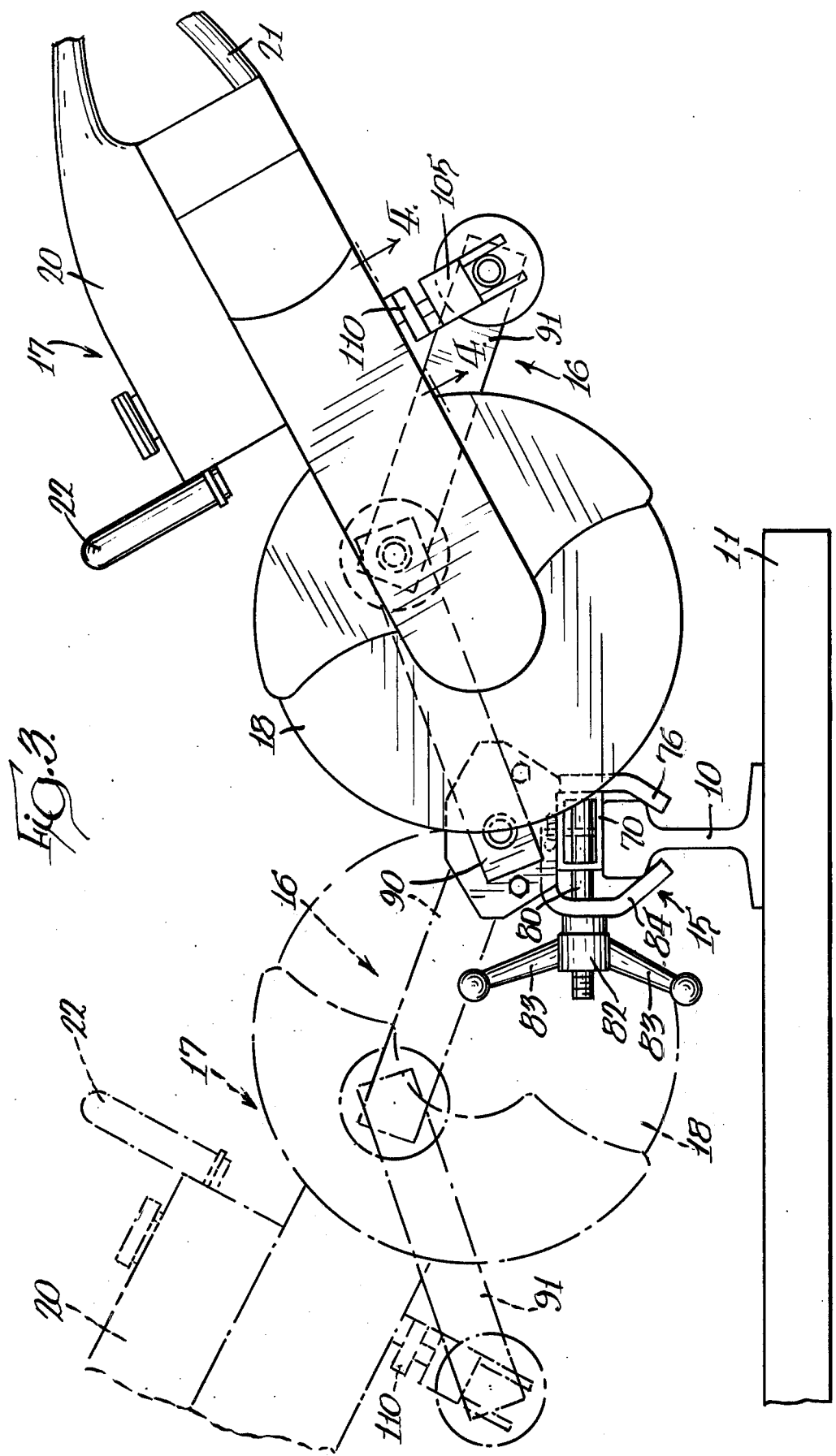

RAIL CUTTING APPARATUS

BACKGROUND OF THE INVENTION

This invention pertains to a rail cutting apparatus and, more particularly, to a portable rail saw operable from both sides of a rail for complete cutting therethrough.

The prior art includes a prior structure of the assignee of this application as shown in U.S. Pat. No. 4,068,415, wherein a linkage structure pivotally connected to a rail-engaging clamp supports a rail saw for making the major cut through a rail from one side of the rail and completing the cut from the other side, with the structure requiring an inversion of the saw. This structure has disadvantages in that the saw has to be inverted and, if driven by a gas engine, could result in leakage of gasoline.

Additional devices are shown in U.S. Pat. Nos. 3,974,596 and 4,033,074 which provide for operation of a rail saw from either side of a rail without inverting the saw. In the first of these patents, it is necessary to remove the rail saw from the mounting structure and reposition it for operation from the second side of the rail. In the second patent, the rail saw can be pivoted relative to its mounting structure for orientation in two different positions for operation at opposite sides of the rail. However, in this patent, there is no structure for positively holding the saw in either orientation and it is necessary to have a saw guide fixed to the rail clamping structure for guiding the saw. This saw guide is subject to wear and, therefore, there is diminishing accuracy of the cut. Additionally, there is a lack of adjustability of the orientation of the saw relative to the rail.

SUMMARY OF THE INVENTION

A primary feature of the rail cutting apparatus disclosed herein resides in the mounting of the rail saw on linkage structure enabling operation of the rail saw from both sides of the rail, with positive upright positioning of the rail saw in either of two orientations by structure associated with the mounting elements.

A primary object of the invention is to provide a new and improved rail cutting apparatus having a pair of links pivotally interconnected forming a linkage structure connected to a rail-engaging clamp and, also, carrying the rail saw with there being an offset arm pivotally connected to the linkage structure and carrying the rail saw for pivotal movement about an axis lying in the plane of the cutting element of the rail saw whereby the saw may be rotated into two different orientations for operation from opposite sides of the rail, and with coacting means on the offset arm and the rail saw mounting structure to positively limit the rotative positions of the rail saw and with said coacting means being adjustable.

Still another object of the invention is to provide rail cutting apparatus as defined in the preceding paragraph wherein a mounting bar connected to the rail saw has a mounting element for rotatable mounting on the offset arm and carries a stop bar which has a pair of adjustable stop members rotatably positioned along with the orientation of the saw to have one stop member engage the stop pin in either of said orientations and with the stop member forming a reaction contact against a manually-applied rotative force to hold the saw in the desired cutting plane in both of said orientations of the rail saw.

DESCRIPTION OF THE DRAWINGS

FIG. 1 is a perspective view of the rail cutting apparatus applied to a rail of a railroad right-of-way;

FIG. 2 is an enlarged fragmentary front elevational view of the apparatus;

FIG. 3 is an end elevational view of the structure shown in FIG. 1 with the structure shown in full line position at one side of the rail and in broken line position at the other side of the rail;

FIG. 4 is a fragmentary plan view of the rail saw mounting structure carried at the end of the linkage; and FIG. 5 is a view, similar to FIG. 4, showing the mounting structure in a different rotative position.

DESCRIPTION OF THE PREFERRED EMBODIMENT

The rail cutting apparatus is shown generally in FIG. 1 in association with a rail 10 supported by spaced-apart ties 11.

The rail cutting apparatus includes a rail clamp, indicated generally at 15, which pivotally mounts a linkage structure, indicated generally at 16, and with the linkage structure mounting a rail saw, indicated generally at 17. The rail saw includes a power-driven abrasive disc 18 driven by suitable means from an engine, such as a gas engine 19, having a fuel tank 20. The saw has handle members 21 and 22 facilitating manual movement thereof.

The general operation of the rail cutting apparatus is best shown in FIG. 3 wherein the rail saw 17 is shown in broken line at the same side of the rail as shown in FIG. 1 whereby an operator may move the abrasive disc 18 down through a major part of the rail 10. In order to complete the cut, the rail saw needs to be positioned at the opposite side of the rail 10, as shown in full line in FIG. 3, wherein the abrasive disc 18 is in the same plane as when at the other side of the rail and may be moved through the rail 10 to complete the cut.

The general structure of the rail clamp 15 and the linkage structure 16 is the same as that shown in an application of William P. McIlrath entitled "Rail Cutting Apparatus", Ser. No. 648,749, filed Jan. 12, 1976. The disclosure of said prior application is incorporated herein by reference.

The rail clamp 15 includes a tubular base 70 which mounts a pair of depending fingers 76 engageable with one side of the head of the rail. Additionally, a V-shaped finger 84 is carried on a threaded shaft 80 which has a nut 82 with wing-like handles 83. Tightening of the nut 82 draws the clamp members firmly against the head of the rail in the manner more particularly described in the prior pending application referred to above.

The linkage structure 16 includes a first link 90 and a second link 91 which are pivotally interconnected, with the first link 90 being pivotally connected to the rail clamp 15 and the second link 91 being pivotally connected to an offset arm 95. Each of these three pivot connections are of the same construction as described in the prior pending application, including a pair of circular plates 96 and 97 associated one with each pivotally interconnected part and with a bearing member, such as a sheet of Teflon 98 disposed therebetween and with the parts held together by a threaded bolt structure 99 and compressed by a spring member, such as a Belleville spring 100. This construction of the three pivot connections provides a rigid mounting for the rail saw which minimizes any side sway of the structure.

The offset arm 95 has a mounting block 105 at an end thereof with the mounting block provided with an opening 106 to receive a mounting element, such as a pin 107 carried by a pivot or mounting bar 110 which connects to the frame of the rail saw 17 by attaching means, such as bolts 111. The mounting bar and mounting pin are related to the rail saw whereby the mounting pin 107 lies in the plane of the abrasive disc 18, as indicated by the broken line identifying the saw centerline in FIGS. 2, 4, and 5.

The mounting bar 110 may be rotatably oriented by rotation in the directions indicated by the arrows in FIGS. 4 and 5 to two limit positions with the mounting bar 110 either extending away from the offset arm 95 (FIG. 4) or in overlying relation therewith (FIG. 5). In both positions, the saw centerline remains the same relative to the linkage structure 16.

With this construction, it is possible to orient the rail saw in either of two rotative positions for operation from opposite sides of the rail 10 without inverting the rail saw. The cut may then be made under the control of the operator by raising and lowering the saw as permitted by movement of the linkage structure 16.

Positive stop means are provided to accurately control the orientation of the abrasive disc 18. This positive stop means includes a stop pin 120 extending upwardly from the mounting block 105 and positioned for coaction with a pair of threaded adjustable stop members 121 and 122 which are carried on a stop bar 123 connected to and rotatable with the mounting bar 110.

In each position of orientation of the rail saw, the stop means and, particularly, the stop pin, forms a reaction contact whereby an operator using the saw urges the stop member against the stop pin during the cutting of the rail to hold the saw in the desired plane throughout the cut. This, in combination with the rigid mounting provided by the circular plate pivot interconnection structure, assures a rigid, firm guiding of the saw throughout the cutting of the rail. The rail saw encounters hard usage and can be dropped with the result that structural elements may become slightly misaligned and the adjustments of the stop members 121 and 122 enable suitable adjustment of their position to bring the abrasive disc 18 into proper cutting alignment with the rail.

With the rail saw positioned as shown in FIG. 1, and in broken line in FIG. 3, the mounting bar 110 is positioned as shown in FIG. 5 and, after the major part of the rail is cut, the rail saw is moved to an elevation above the linkage structure 16 and then the rail saw is rotated to bring the mounting bar 110 to the position shown in FIG. 4 which, with reversal of the linkage structure 16 to the full line position shown in FIG. 3, places the rail saw at the opposite side of the rail to complete the cut.

I claim:

1. A rail cutting apparatus comprising a rail clamp, a linkage structure including a pair of pivotally interconnected links with one link pivoted to the clamp, an offset arm connected to the other of said links, a cutting device having a mounting bar with a mounting element lying in a plane containing the cutting element of the cutting device, means on the offset arm to rotatably engage the mounting element and guide the mounting bar for rotation about an axis lying in said plane and coacting means on said offset arm and mounting bar to positively limit the relative positions of said cutting device relative to said clamp including a stop pin on said offset arm and a pair of adjustable stop members carried by said mounting bar with one at either side of the mounting element to engage said stop pin in either of two rotative positions of the mounting bar.

2. A rail cutting apparatus including a clamp structure mountable to a rail and a rail saw associated with the clamp structure and operable in upright position from both sides of the rail to make a complete cut through the rail, and a linkage structure connecting the rail saw to the clamp including a first link pivotally connected to the clamp, a second link pivotally connected in end-to-end relation with the first link, an offset arm pivotally connected to said second link and having a mounting block, the aforesaid three pivot connections of said links to each other, the rail clamp and the offset arm each comprising a pair of circular plates with bearing material therebetween and spring-urged together to provide a rigid mounting for said rail saw, a pivot bar connected to said rail saw and having a mounting member in the plane of the cutting element of the rail saw, means releasably mounting said mounting member to said mounting block for rotation about an axis lying in said plane to present the saw toward the rail in either of two orientations in said plane, and positive stop means on said mounting block and pivot bar providing a reaction contact against a manually-applied rotative force to hold the saw in said plane in both of said orientations and including a pin extending upwardly from said mounting block, a stop bar secured to said mounting member and carrying a pair of spaced-apart adjustable stop members positioned to have one stop member engage the stop pin in either of said orientations.

* * * * *